Figure 1:
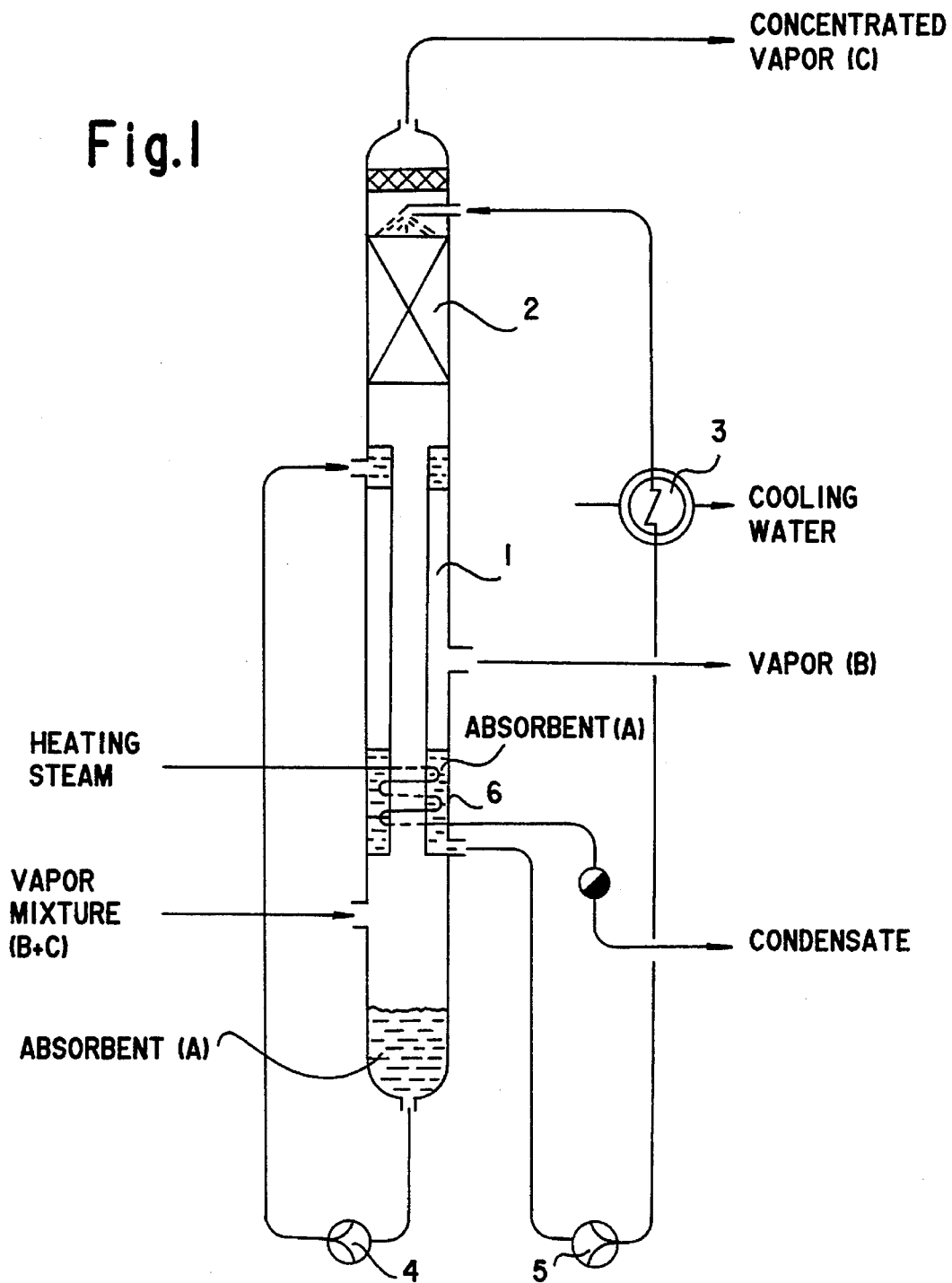

United States Patent [19]

Holm

[11] Patent Number: 5,462,582
[45] Date of Patent: Oct. 31, 1995

[54] SEPARATION AND CONCENTRATION METHOD BASED ON SELECTIVE ABSORPTION

[75] Inventor: Kaj Holm, Espoo, Finland

[73] Assignee: K.H. Innovations Oy, Espoo, Finland

[21] Appl. No.: 211,538

[22] PCT Filed: Oct. 16, 1992

[86] PCT No.: PCT/FI92/00277

§ 371 Date: Jul. 26, 1994

§ 102(e) Date: Jul. 26, 1994

[87] PCT Pub. No.: WO93/07953

PCT Pub. Date: Apr. 29, 1993

[30] Foreign Application Priority Data

Oct. 16, 1991 [FI] Finland ................................. 914890

[51] Int. Cl.⁶ .............................................. B01D 53/14
[52] U.S. Cl. .................... 95/175; 95/177; 95/180; 95/184; 95/190; 95/194; 95/237
[58] Field of Search .................... 95/174–180, 184, 95/186, 190, 192–194, 204, 211, 231, 237

[56] References Cited

U.S. PATENT DOCUMENTS

| | | | |
|---|---|---|---|
| 1,934,029 | 11/1933 | Asbury | 95/237 X |
| 3,344,585 | 10/1967 | Hollowell | 95/211 X |
| 3,590,555 | 7/1971 | Wackernagel | 95/174 |
| 3,664,091 | 5/1972 | Hegwer | 95/176 X |
| 4,548,620 | 10/1985 | Albiol | 95/174 |
| 4,636,284 | 1/1987 | English et al. | 95/190 X |
| 4,692,179 | 9/1987 | Mehra | 95/174 X |
| 4,979,966 | 12/1990 | Rojey et al. | 95/174 |

FOREIGN PATENT DOCUMENTS

| | | |
|---|---|---|
| 385914 | 6/1988 | Austria . |
| 0172408 | 2/1986 | European Pat. Off. . |

OTHER PUBLICATIONS

WO, A1, 9006163, Jun. 14, 1990.
Office Action dated May 20, 1992 issued in the corresponding Finnish Patent Application No. 914890.
Office Action dated Jun. 24, 1993 issued in the corresponding Finnish Patent Application No. 914890.

*Primary Examiner*—Robert Spitzer
*Attorney, Agent, or Firm*—Nikaido, Marmelstein, Murray and Oram

[57] ABSTRACT

When a vapor-phase mixture is brought in contact with a liquid absorbent kept at a temperature above the condensation temperature of the vapor-phase mixture, the vapor-phase mixture becomes concentrated for those components which are absorbed by the absorbent in small or negligible amounts. In the method according to the invention, the regeneration of the absorbent essentially utilizes the heat of absorption of the absorbed components. The actual absorption process can be isothermal or adiabatic or a combination of these. The method is particularly suited to the separation of vapor-phase mixtures of minimum boiling point azeotropes.

8 Claims, 3 Drawing Sheets

SEPARATION AND CONCENTRATION METHOD BASED ON SELECTIVE ABSORPTION

The present invention concerns a method according to the preamble of claim 1 for separating and/or concentrating liquids of partial or full mutual solubility.

The most frequently employed methods for separating mutually soluble liquids are distillation and a combination of stripping and distillation. A particular problem is presented by azeotropic mixtures, since these cannot be separated into their basic components by conventional distillation. An azeotropic mixture can be separated by distillation only through adding to the mixture an appropriate auxiliary component which forms a new ternary azeotrope with the components of the initial binary azeotrope. The basic components of the binary azeotrope can now be separated by distillation by way of utilizing the difference between the boiling points of the binary and ternary azeotropes and recycling the auxiliary component, which is concentrated by decanting or distillation. Distillation of the azeotropic mixture typically requires from 2 to 3 distillation columns, multiple heat exchangers, vessels and pumps.

Distillation is a relatively expensive separation method due to its high specific energy consumption. The reason for the high energy consumption is related to the fact that, in addition to the component recovered via the column top, energy must also be imported for the evaporation of the recycled component which is mandatory for the operation of the distillation column. Azeotropic distillation has both higher investment and energy costs per distilled mass unit than those of conventional distillation. Energy consumption is further increased by the use of the auxiliary component, number of distillation columns and required recycle circuits. A special drawback of azeotropic distillation are the losses of the auxiliary component resulting in extra costs and frequently environmental problems as well.

Absorption is conventionally employed for separating mixtures of vapours and gases. The greatest drawback of the absorption method is its high specific energy consumption which is caused by the regeneration of the absorbent. It is an object of the selective absorption method according to the present invention to simplify the separation process of mutually soluble liquids, and more specifically, to reduce the specific energy consumption of the separation process. The method according to the invention is in certain cases capable of replacing distillation and stripping either partially or entirely. A particularly advantageous application of the method according to the invention is in the separation of minimum boiling point azeotropes. The specific energy consumption of the method is smaller than that of distillation, because the regeneration of the absorbent is essentially performed by virtue of the heat of absorption and recycle return arrangements are not mandatory. The control of the separation process according to the invention is extremely simple, and the control range covers 0 . . . 100% of the process input capacity. The selective absorption method according to the invention makes the recovery of solvents profitable even for small lots of solvents and those forming azeotropes difficult to separate. Such solvents are used by the paint manufacturers, pharmaceuticals industry and printing houses. The characterizing properties of the method according to the invention are disclosed in the annexed claims.

The method is based on the capability of specific liquids to absorb certain vapours. The same phenomenon is physically utilized in absorption-type heat pumps in which the most commonly employed liquid-vapour pairs are formed by water capable of absorbing ammonia vapour and the aqueous solution of lithium bromide which can absorb water vapour.

The method according to the invention differs from the absorption-type heat pump in that the vapour brought in contact with the absorbent contains two or more components and that the regeneration is essentially carried out with the help of the heat of absorption.

In the selective absorption method according to the invention the mixture formed by the mutually soluble liquids is evaporated and the vapour is brought in contact with an appropriate absorbent in an absorber. The vapour exiting the absorber is concentrated for those components which are absorbed in small or negligible amounts by the absorbent. The absorbed components are separated from the absorbent by evaporation, that is, the absorbent is regenerated by steam stripping. Through a suitable selection of the pressure of evaporation, the absorbent can be regenerated with the help of the heat of absorption. The regenerated absorbent is recycled back to the absorber, thus making the operation a continuous process.

Figure 2:
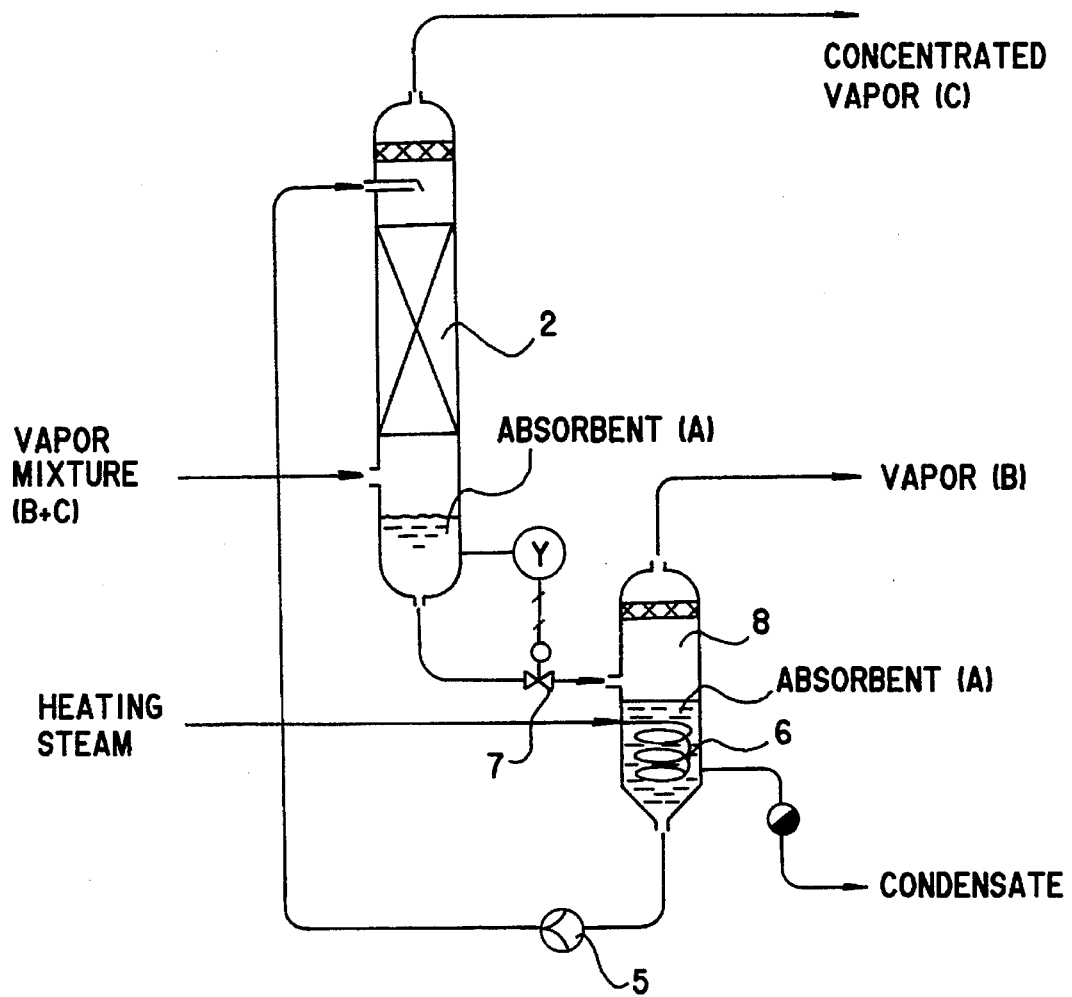
Figure 3:
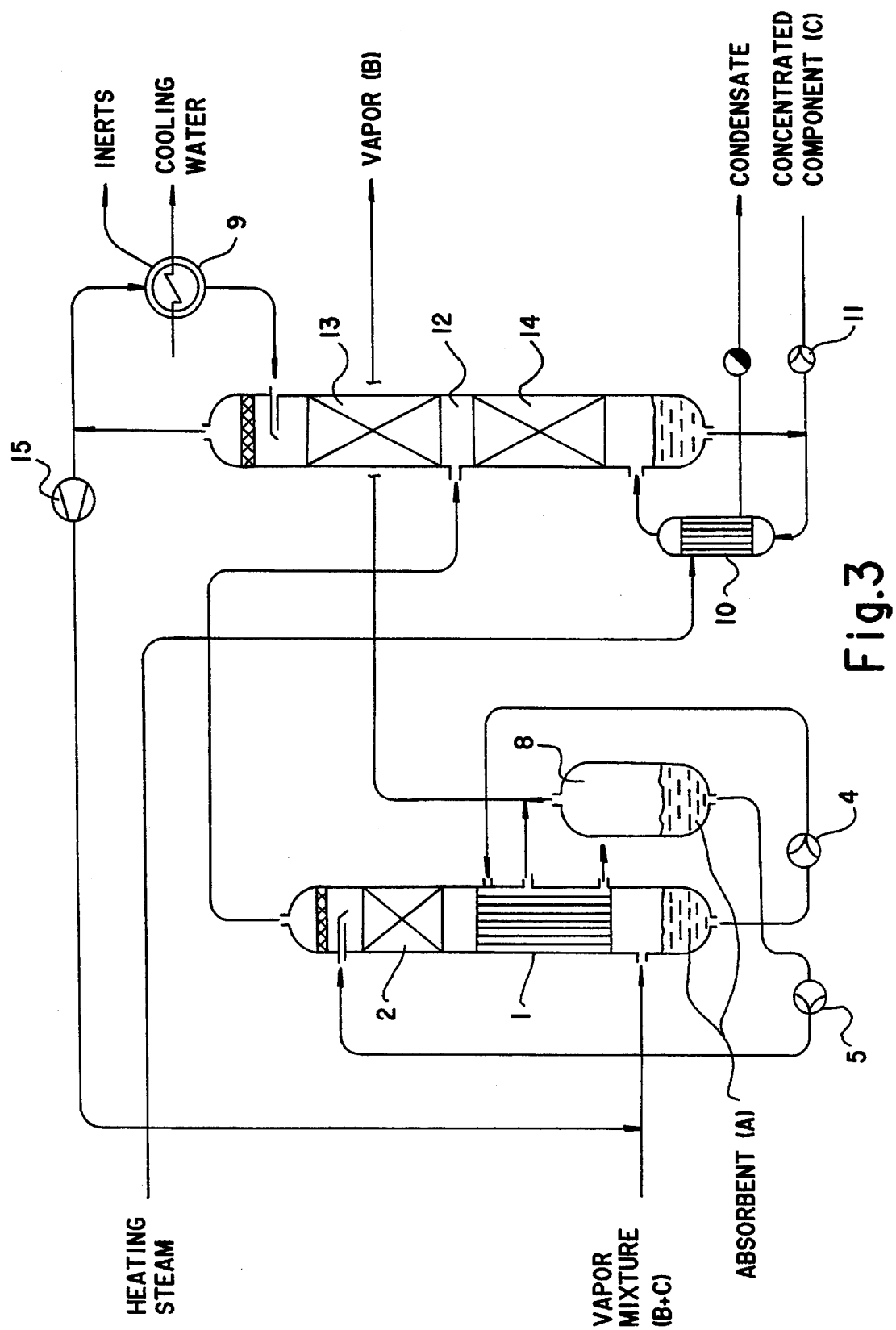

The selective absorption method according to the invention and its different application possibilities are described in the following with the help of examples by reference to the annexed drawings, in which FIG. 1 shows a selective absorption method according to the invention, FIG. 2 shows another selective absorption method according to the invention, and FIG. 3 shows a third selective absorption method according to the invention.

The different components are recognized in the examples by the following symbols:

Absorbents by A (A1, A2, A3, etc.)

Components to be absorbed by B (B1, B2, B3, etc.)

Components to be concentrated by C (C1, C2, C3, etc.)

The absorbents can be selected from the group of, e.g., aqueous solutions of the salts or hydroxides of alkali and earth alkali metals, the components to be absorbed can be, e.g., water, methanol, ethanol, propanol or butanol, and the components to be concentrated can be any compounds fully or partially soluble in the components to be absorbed, provided that said compounds have a higher vapour pressure than that of the absorbent employed and the employed absorbent absorbs them in essentially smaller amounts than the components to be absorbed. The abovementioned absorbents and components to be absorbed are given as examples, so they must not be understood as limitations to the method according to the invention.

An embodiment of the method according to the invention is shown in FIG. 1. In this example the component C to be concentrated and the component B to be absorbed form a minimum boiling point azeotrope.

In FIG. 1 a cooled tubular-jacket absorber 1 is connected in series with an uncooled absorber 2 packed with filler pieces. The azeotropic vapour mixture formed by the components B and C is fed to the lower end of the jacketed absorber 1 and further upward through the inner tube of the jacketed absorber 1 to the packed absorber 2. In both the jacketed absorber 1 and the packed absorber 2 the vapour is brought in contact with the liquid absorbent A which flows downward first through the packed absorber 2 and then as a thin film through the jacketed absorber 1. Both absorbers (1 and 2) operate thus according to the counter-current principle. In the jacketed absorber 1, B is absorbed into A, and consequently, the temperature of A is elevated by the heat of absorption. Excessive temperature increase in A, which is disadvantageous to absorption, is prevented by cooling the outer surface of the inner tube in the jacketed absorber. The cooling is achieved by gravity flow of the diluted A along the outer surface of the inner tube as a thin film and adjusting the pressure in the jacket volume with the help of a condenser and a vacuum pump to such a level that the absorbed B is separated by evaporation from A. Thus, the regeneration of the absorbent A is essentially carried out with the help of the heat of absorption.

The packed absorber 2 provides a relatively high surface area for phase transition, and consequently, the exiting vapour is essentially equilibrated with the concentrated absorbent A entering the absorber. The exiting vapour is concentrated for component C, because A has principally absorbed component B alone. The steam concentrated for component C is taken from the packed absorber to condensation. The heat content of the vapour can be utilized in, e.g., preheating of the feedstock.

The bottom part of the jacketed absorber acts as a storage for the diluted absorbent A and a separation volume for the liquid and vapor phases. The diluted absorbent A is transferred to the jacket volume of the jacketed absorber 1 with the help of a recirculating pump 4 to concentration, that is, regeneration. The bottom part of the jacket volume in the jacketed absorber 1 acts as a storage for the absorbent A, wherefrom A is pumped with the help of a recirculating pump 5 via a cooler 3 to the packed absorber 2. Cooling of the absorbent A below the condensation temperature of the vapour mixture formed by components B and C achieves condensation in the packed absorber, which corresponds to the recycle return in a conventional distillation column.

A heating coil 6 placed in the jacket volume of the jacketed absorber is necessary during start-up and it can also be utilized for compensating heat losses from the equipment.

Pilot tests performed indicate that minimum boiling point azeotropes formed by alcohols of small molecule size with water act in the concentration process according to the invention as ideal gases.

The use of a cooled absorber permits operation with a smaller recirculating volume of the absorbent A, because the absorption capacity is increased with a decrease in the temperature.

The evaporation of the mixture formed by components B and C prior to the inlet of the absorber 1 can be performed using a heat pump whose source of heat is the heat of condensation released by the concentrated component C.

Another route for implementing the method according to the method is shown in FIG. 2.

According to FIG. 2 the vapour mixture formed by B and C is fed to the bottom part of an uncooled packed absorber 2. Concentrated liquid absorbent is fed with the help of a pump 5 to above the filler-piece bed of the absorber 2. The absorbent A flowing by gravity down along the filler-piece bed absorbs B and is heated by the heat of absorption. The diluted and heated absorbent A which accumulates to the bottom part of the absorber 2 is transferred via a level-sensitive expansion valve 7 to an expansion vessel 8 whose pressure is kept sufficiently low for expansion evaporation with the help of, e.g., a condenser and a vacuum pump. The heat of condensation contained in the vapour of component B generated in the expansion vessel 8, as well as the heat of condensation contained in the vapour enriched with component C in the absorber 2, can be utilized elsewhere in the process at points requiring heat input at an appropriate temperature level.

The bottom part of the absorber 2 acts as a storage for the diluted absorbent A, while the bottom part of the expansion vessel 8 acts as a pump storage for the concentrated absorbent A. For start-up and compensation of heat losses, the expansion vessel is provided with a heating coil.

An uncooled absorber requires a larger volume of the recirculating absorbent than a cooled absorber but is cheaper to construct, because a heat-exchanging surface is needed only on the heating coil. No essential difference in specific energy consumption exists between a cooled and uncooled absorber, because in both constructions the heat of absorption can be utilized for regenerating the absorbent.

FIG. 3 shows an exemplifying application of the method according to the invention in which the concentration efficiency is improved by connecting the concentration distillation in series with the absorber. This configuration is particularly suited to the concentration of a minimum boiling point azeotrope when an almost pure fraction of component C is desired. Concentration can be carried out without the use of a solvent necessary in conventional azeotropic distillation, and moreover, with a smaller specific energy consumption.

According to FIG. 3 the minimum boiling point azeotrope comprised of components B and C is fed in vapour phase to the bottom end of tube volume of an absorber-regenerator 1. From here, the vapour mixture is routed via the tubes of the absorber-regenerator upward and further via a packed absorber 2 to a distillation column 12. The absorbent A flowing down by gravity as a thin film along the tubes of the absorber-regenerator 1 and the packed absorber 2 absorbs component B from the vapour mix. The diluted absorbent A flows down through the tube volume of the absorber-regenerator 1 accumulating in its bottom end which acts as a pump storage for the diluted absorbent A. From here, diluted A is transferred with the help of a pump 4 to the upper part of the jacket volume of the absorber-regenerator 1, wherefrom it is routed to flow by gravity as a thin film along the outer surfaces of the inner tubes. By arranging the pressure in the jacket volume of the absorber-regenerator to a suitable level with the help of, e.g., a condenser and a vacuum pump, the absorbed component B is separated by evaporation from absorbent A. The concentrated absorbent A is transferred to an expansion vessel 8, which also acts as a pump storage for the concentrated absorbent A. The concentrated absorbent A is recirculated with the help of the pump 5 onto the filler-piece bed of the absorber 2.

In the distillation column the vapour mixture comprised of components B and C, which at exit from the absorber 2 has a strength of component C exceeding that in the azeotrope, is further concentrated in a distillation column 12. In the stripping section 14 of the column, component B is separated by stripping from the component C to be concentrated which is removed from the bottom of the column 12 with the help of a bottom product pump 11. An evaporator 10 mounted on the bottom is steam-heated and circulation is based on natural convection.

The higher the vapour mixture rises in the concentrating section 13 of the column 12, the more its composition approaches that of the azeotrope. In fact, the vapour mixture becomes leaner for component C as the proportion B increases. Recycle recirculation requires a condenser 9, wherefrom the condensate is returned to the column 12. The vent vapour having a composition close to azeotropic, is returned with the help of a blower 15 back to the inlet of the absorber-regenerator 1.

The bottom evaporator 10 can also act as a top condenser for the column 12 if the vapour exiting from the top section of the column 12 is first compressed to such a high pressure that the condensation temperature of said vapour is above the evaporation temperature in the bottom section of the column. This type of open circulation heat pump can also be replaced with a conventional closed circulation heat pump.

To those versed in the art it is evident that the scope of the invention is not exhausted by the exemplifying embodiments described above; instead, the invention can be varied within the disclosed claims.

I claim:

1. A separation and/or concentration method for minimum boiling point azeotropic mixtures based on selective absorption, said method comprising the steps of:

bringing a vapour-phase mixture into contact with at least one liquid absorbent, said absorbent being at a temperature which is above a condensation temperature of the vapour-phase mixture and said absorbent is capable of absorbing, in an absorption phase, one or more components of the mixture, whereby the mixture becomes concentrated beyond the azeotropic concentration for components not absorbed in essential quantities by the absorbent, wherein the one or more components absorbed in the absorbent is separated from the absorbent by evaporation at a lower pressure than that employed during the absorption phase in a manner in which a regeneration of the absorbent is essentially performed with the help of a heat of absorption.

2. A method as defined in claim 1, wherein the absorption phase is performed in a counter-current operated cooled or uncooled absorber (1,2) or a combination thereof.

3. A method as defined in claim 2, wherein the absorbent to be regenerated is used for cooling the absorber (1).

4. A method as defined in claim 2, wherein, when the concentrated mixture is routed to a separating means for separting from the concentrated mixture an azeotropic or at least essentially azeotropic mixture which is returned to an inlet of the absorber by simultaneously mixing the concentrated mixture with the mixture feed entering the absorber (1).

5. A method as defined in claim 2, wherein the temperature of the at least one liquid absorbent is brought higher than the condensation temperature of the vapour by connecting an adiabatic absorber into a vapour flow downstream from the absorber.

6. A method as defined in claim 1, wherein the regeneration is carried out at least partially as expansion evaporation.

7. A method as defined in claim 1, wherein at least one additional absorbent, different from said at least one liquid absorbent, is used in conjunction with said at least one liquid absorbent for separating and concentrating components of the mixture so that the absorbents are sequentially brought in contact with the mixture.

8. A method as defined in claim 1, wherein a concentration efficiency is controlled by adjusting a concentration and the temperature of the at least one liquid absorbent.

\* \* \* \* \*